United States Patent
Brach et al.

(10) Patent No.: US 11,496,014 B2
(45) Date of Patent: Nov. 8, 2022

(54) WINDING HEAD ARRANGEMENT FOR AN ELECTRIC ROTATING MACHINE

(71) Applicant: Siemens Aktiengesellschaft, Munich (DE)

(72) Inventors: Karsten Brach, Berlin (DE); Jens Dahl Jensen, Berlin (DE); Hartmut Rauch, Berlin (DE); Olaf Rehme, Hamburg (DE); Jakob Schneck, Berlin (DE); Oliver Stier, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/602,194

(22) PCT Filed: Mar. 31, 2020

(86) PCT No.: PCT/EP2020/059098
§ 371 (c)(1),
(2) Date: Oct. 7, 2021

(87) PCT Pub. No.: WO2020/207858
PCT Pub. Date: Oct. 15, 2020

(65) Prior Publication Data
US 2022/0094227 A1    Mar. 24, 2022

(30) Foreign Application Priority Data
Apr. 8, 2019    (EP) .................... 19167872

(51) Int. Cl.
*H02K 3/38* (2006.01)
*H02K 3/50* (2006.01)
*H02K 15/10* (2006.01)

(52) U.S. Cl.
CPC ................ *H02K 3/38* (2013.01); *H02K 3/50* (2013.01); *H02K 15/105* (2013.01); *H02K 2203/09* (2013.01)

(58) Field of Classification Search
CPC ...... H02K 3/50; H02K 3/505; H02K 15/0081; H02K 2203/09
See application file for complete search history.

(56) References Cited

U.S. PATENT DOCUMENTS

| 1,238,280 | A | 8/1917 | Field | |
|---|---|---|---|---|
| 2002/0182411 | A1* | 12/2002 | Leonardi | H01F 41/16 428/402.2 |

(Continued)

FOREIGN PATENT DOCUMENTS

| DE | 10 2009 032 882 B3 | 11/2010 |
|---|---|---|
| EP | 1 742 330 A1 | 7/2005 |

(Continued)

OTHER PUBLICATIONS

PCT International Examination Report and Written Opinion of International Examination Authority dated Jul. 9, 2020 corresponding to PCT International Application No. PCT/EP2020/059098 filed Mar. 31, 2020.

*Primary Examiner* — Quyen P Leung
*Assistant Examiner* — Minki Chang
(74) *Attorney, Agent, or Firm* — Henry M. Feiereisen LLC (57) ABSTRACT

A winding head arrangement for an electric rotating machine includes a base body including an electrically conductive material having an electrically insulating coating, and a plurality of conductors made from a first metal material and connected to the base body via the electrically insulating coating by a first additive production method.

31 Claims, 4 Drawing Sheets

(56) References Cited

U.S. PATENT DOCUMENTS

| | | | |
|---|---|---|---|
| 2006/0202584 A1 | 9/2006 | Jore et al. | |
| 2015/0076951 A1 | 3/2015 | Lynch et al. | |
| 2018/0323685 A1* | 11/2018 | Blum | H02K 15/12 |
| 2019/0229594 A1* | 7/2019 | Kuemmlee | H02K 15/0025 |

FOREIGN PATENT DOCUMENTS

| | | | | |
|---|---|---|---|---|
| EP | 3 297 131 A1 | 9/2016 | | |
| JP | H0670508 A | 3/1994 | | |
| RU | 2294588 C2 | 2/2007 | | |
| WO | WO-2018050331 A * | 3/2018 | | B63H 21/17 |
| WO | WO 2018153745 A1 | 8/2018 | | |

\* cited by examiner

WINDING HEAD ARRANGEMENT FOR AN ELECTRIC ROTATING MACHINE

CROSS-REFERENCES TO RELATED APPLICATIONS

This application is the U.S. National Stage of International Application No. PCT/EP2020/059098, filed Mar. 31, 2020, which designated the United States and has been published as International Publication No, WO 2020/207858 A1 and which claims the priority of European Patent Application, Serial No. 19167872.1, filed Apr. 8, 2019, pursuant to 35 U.S.C. 119(a)-(d).

BACKGROUND OF THE INVENTION

The invention relates to a winding head arrangement for an electric rotating machine.

The invention further relates to a stator for an electric rotating machine that has a magnetic field-guiding stator element and at least one winding head arrangement of this type.

The invention moreover relates to an electric rotating machine having at least one stator of this type.

Furthermore, the invention relates to a method for producing a winding head arrangement for an electric rotating machine.

Generally, the stator windings of an electric rotating machine of this type, which can be operated at a power of at least one megawatt, are embodied as formed coils. Formed coils are produced by means of drawing, casting or powder metallurgy for example. A winding head is located on the ends of the formed coils and said winding head is provided by means of bending and angling the conductors of the formed coils. This winding head requires a considerable axial installation space. Ohmic losses occur as a result of the additional inactive conductor length of the winding head and said ohmic losses reduce the efficiency of the electric rotating machine. Furthermore, it is necessary to cool the winding heads. Further installation space is required for the cooling.

In particular in the case of rapid-running low pole machines, the bearing distance that is enlarged by means of the winding heads has a detrimental effect on the rotor dynamics. Moreover, additional complex reinforcing measures are required on account of the large conductor lengths in order to prevent unacceptable oscillations and deformations during operation. Furthermore, the entire length and the weight of the electric rotating machine increases. In particular in the case of a modular construction of large machines in which multiple partial machines in an axial direction form an entire machine, considerable lengths that are not utilized electrically occur on account of the winding heads.

The winding heads of the formed coils are produced with a great deal of complexity in a semi-automated manner, for example in that copper conductors are bent in such a manner that they can be placed fitting into the grooves. A subsequent connection of the respective copper conductors, an insulation of the connecting sites and a reinforcement of the copper conductors with respect to one another is performed manually with a great deal of complexity. In principle, it is only possible to realize different conductor geometries in the grooves and in the winding heads with a great deal of complexity, for example, using different conductor lengths that are connected by soldering.

In the case of toothed coil windings, in particular in a flat wire embodiment, it is possible for the distance between adjacent grooves to only be as small as is rendered possible by the bending radius, which is to be maintained, of the insulated copper conductor.

The patent specification DE 10 2009 032 882 33 describes a method for producing a formed coil for a tier winding of a dynamo electric machine and also a formed coil that is produced by means of the aforementioned method. In order to simplify the production of the formed coil, this formed coil is produced from a blank coil, wherein the blank coil has two longitudinal sides that are provided for the purpose of being placed into grooves of a stator or a rotor of the dynamo electric machine. The blank coil has two winding head sides that are provided for the purpose of in each case forming a winding head of the formed coil, wherein the longitudinal sides are bent by 90° in such a manner in order to place the longitudinal sides into the grooves and to angle the winding head sides from the longitudinal sides.

The patent specification EP 1 742 330 B1 describes a stator winding head for a stator part of a turbo generator. The stator winding head is formed in the shape of a disc having a central opening for feeding through an armature, wherein the disc has an insulating base body and an electrical connection is integrated into said base body so as to contact a stator conductor. The contacting arrangement is produced in the form of a plug connection and/or using via arrangements.

The unexamined patent application EP 3 297 131 A1 describes a stator for an electric rotating machine that has a stator laminated core having stator rods and at least one stator winding head board having an insulating base body. In order to reduce the axial length of the stator, it is proposed that conductor tracks are integrated into the insulating base body, wherein the at least one stator winding head board lies on an end face of the stator laminated core and wherein the conductor tracks are connected to the coil rods in a materially bonded manner.

The object of the invention is to disclose a winding head arrangement for an electric rotating machine and said winding head arrangement is to be simpler and more cost-effective to produce in comparison with the prior art.

SUMMARY OF THE INVENTION

One solution of the object is provided, for example by a winding head arrangement as set forth hereinafter, by stator as set forth hereinafter, by an electric rotating machine as set forth hereinafter, or by a method as set forth hereinafter. Possible embodiments of the invention are disclosed for example in dependent claims.

The object is achieved in accordance with the invention by a winding head arrangement for an electric rotating machine having at least one base body and a plurality of conductors that are embodied from a first metal material, wherein the base body comprises, in other words has, an electrically conductive material having an electrically insulating coating, wherein the conductors are connected to the base body via the electrically insulating coating, wherein the conductors are applied to the electrically insulating coating by means of a first additive production method.

Furthermore, the object is achieved in accordance with the invention by a stator for an electric rotating machine and said stator has a magnetic field guiding stator element and at least one winding head arrangement of this type.

Moreover, the object is achieved in accordance with the invention by an electric rotating machine having at least one stator of this type.

Moreover, the object is achieved in accordance with the invention by a method for producing a winding head arrangement for an electric rotating machine, wherein a base body is produced by at least in part coating an electrically conductive material with an electrically insulating coating, wherein a plurality of conductors that are embodied from a first metal material are connected to the base body by virtue of the fact that the conductors are applied to the electrically insulating coating by means of a first additive production method.

The advantages stated below in reference to the winding head arrangement and preferred embodiments can be transferred accordingly to the stator, the electric rotating machine and the method.

The consideration to optimize the production of a winding head arrangement by the use of an additive production method forms the basis of the invention, wherein conductors are applied to a base body by means of a first additive production method. Additive production methods are for example 3D printing, screen printing or thermal spray processes. An additive production method renders it possible to realize more complex and compact structures. If the base body is coated with an electrically insulating coating, for example embodied from a ceramic material, it is possible in this manner to use an electrically conductive material, for example a metal, an electrically conductive ceramic or an electrically conductive synthetic material, for the base body. An electrically conductive material at room temperature has an electrical conductivity of at least 1.0 MS/m. Conversely, the insulating coating has a specific electric resistance of at least 1010Ω·cm. A base body that is embodied from an electrically conductive material, aluminum for example, behaves more robustly for example in the case of additive application to the conductors, can be more easily and/or precisely processed, by CNC milling for example and is more cost-effective in the mechanical processing.

In one embodiment, the electrically insulating coating is produced by the anodization of a second metal material. The term "an anodization" is understood to mean a controlled oxidative conversion of an, in particular metal, material. The anodization is implemented for example by means of an electrolysis in an aqueous solution. The second metal material is for example aluminum or beryllium. For example, the second metal material is applied to the base body and is subsequently anodized to a homogenous and electrically insulating metal oxide layer, for example embodied from aluminum oxide or beryllium oxide, which is resistant to a disruptive discharge. The conductors are thus connected to the base body by anodization in a simple and cost-effective electrically insulating manner.

In the case of a further embodiment, the base body is produced from a second metal material and the electrically insulating coating of the base body is produced by the anodization of the second metal material. For example, the base body is produced from aluminum, wherein the surface of the base body that is embodied from aluminum is anodized or has been anodized to form an electrically insulating coating that is embodied from aluminum oxide. In addition to the simple and cost-effective production by anodization, the base body is mechanically particularly robust owing to a materially bonded connection between the second metal material and the electrically insulating coating.

A further embodiment provides that the conductors are sprayed onto the electrically insulating coating by means of a first thermal spraying method, in particular by means of cold gas spraying. Thermal spraying methods are for example arc spraying, plasma spraying, flame spraying or cold gas spraying. It is possible with the aid of a thermal spraying method in comparison to other additive production methods, to provide thick layers, for example in the millimeter range and in the centimeter range, in a short period of time and in a geometrically particularly flexible manner. The production process is consequently simpler and more cost-effective owing to a thermal spraying method.

In one embodiment, the electrically insulating coating has an essentially constant first thickness in the range of 150 μm to 1000 μm. An essentially constant first thickness has a coating thickness deviation of maximum ±10%, in particular of ±5%. A sufficient insulation and resistance to a disruptive discharge is achieved by such a coating thickness.

A further embodiment provides that the conductors have an electrically insulating conductor coating that is produced by anodization. It is also possible by the anodization to apply the conductor insulation in a simple and cost-effective manner in the case of complex conductor arrangements.

In one embodiment, a third metal material is applied to the conductors in an additive manner, in particular by means of cold gas spraying, wherein the electrically insulating conductor coating is produced by the at least in part anodization of the third metal material. For example, the conductors are produced from copper, and aluminum is applied to the conductors and said aluminum is anodized to form an electrically insulating conductor coating that is embodied from aluminum oxide. This is advantageous since both an optimal conductivity of the conductors as well as an optimal insulation and resistance to a disruptive discharge of the electrically insulating conductor coating is achieved.

In the case of a further embodiment, the conductors are connected to the electrically insulating coating via at least one intermediate layer. The intermediate layer is produced for example from silver, aluminum, antimony, magnesium, tin, zinc, lead, tantalum or from a mixture and/or from at least one alloy of said materials. Damage to the electrically insulating coating is avoided during application of the conductors by such an intermediate layer.

In a further embodiment, the intermediate layer is applied by means of a second additive production method to the electrically insulating coating, wherein the second additive production method differs from the first additive production method. While the metal material of the conductors has as high an electrical conductivity as possible, the material of the intermediate layer is suitable for the purpose of embodying a mechanically and thermally stable connection between the electrically insulating coating of the base body and the respective conductors. In particular, the second additive production method is optimized so as to carefully apply the intermediate layer to the electrically insulating coating. Furthermore, the intermediate layer is sprayed on using an additive production method in order to realize a consistent and uniform production method.

A further embodiment provides that the first additive production method is a first thermal spraying method, wherein the second additive production method is a second thermal spraying method, wherein the second thermal spraying method differs from the first thermal spraying method with regard to a speed and/or a size of the particles. For example, in the case of using a soft material such as tin, a low kinetic energy is required so that the solid particles form a dense firmly adhering layer on impact. As a consequence, damage to the electrically insulating coating of the base body is avoided.

In a further embodiment, the intermediate layer is arranged at least in part in grooves of the base body, wherein the grooves of the base body have a profiling and a positive-locking connection is produced via said profiling. For example, the profiling is embodied in a dovetail shape or hammerhead shape. The positive-locking connection is stabilized by the profiling. The intermediate layer is protected against outside influences by an arrangement in grooves.

In one embodiment, the plurality of conductors is mechanically connected to the base body in a thermally stable manner.

During operation of the electric rotating machine, the mechanical connection is in other words thermally stable, which means that the connection does not detach during acceptable operation of the electric rotating machine.

The mechanical connection is in particular materially bonded, wherein the mechanical connection between the conductors and the base body is provided in particular via the electrically insulating coating and/or at least one intermediate layer. The mechanical connection is in other words also indirectly provided via the electrically insulating coating and/or at least one intermediate layer.

BRIEF DESCRIPTION OF THE DRAWING

The invention is further described and explained below with reference to exemplary embodiments that are illustrated in the figures.

DETAILED DESCRIPTION OF PREFERRED EMBODIMENTS

The exemplary embodiments explained below are preferred embodiments of the invention. In the case of the exemplary embodiments, the described components of the embodiments in each case represent individual features of the invention that are to be considered independently from one another and said features of the invention also develop the invention in each case independently of one another and thereby also are to be regarded as a component of the invention individually or in another combination than the illustrated combination. Furthermore, the described embodiments can also be supplemented by further of the features of the invention that are already described.

Identical reference characters have the same meaning in the different figures.

Figure 1:
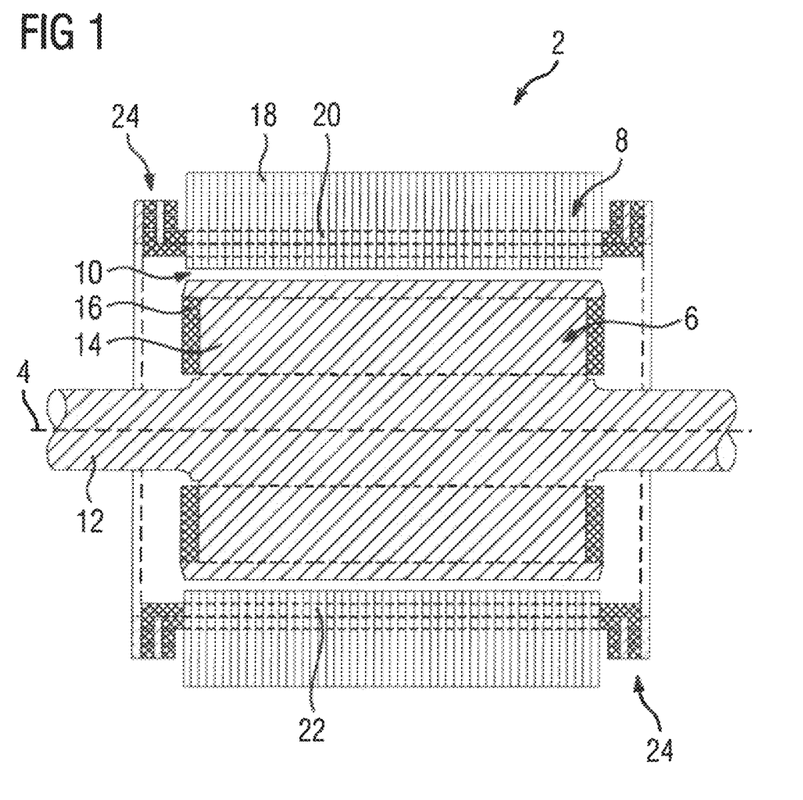
FIG. 1 shows a longitudinal section of an electric rotating machine.

FIG. 1 illustrates a longitudinal section of an electric rotating machine 2 that is embodied in an exemplary manner as a synchronous machine. The synchronous machine has a rotor 6 that can rotate about a rotational axis 4 and that is embodied in an exemplary manner as a salient pole armature, and a stator 8 that surrounds the rotor 6. A gap 10, which is in particular embodied as an air gap, is located between the rotor 6 and the stator 8. The rotational axis 4 defines an axial direction, a radial direction and a circumferential direction. The rotor 6 comprises a shaft 12 and a salient pole 14 having an exciter winding 16. Alternatively, the rotor 6 has permanent magnets or a short circuit cage.

The stator 8 comprises a magnetic field guiding, in particular eddy current suppressing, stator element 18, which is embodied for example as a laminated core, and a stator winding 20. The stator winding 20 comprises coil rods 22 that are produced for example from copper and extend in the axial direction through the magnetic field guiding stator element 18. The axial ends of the coil rods 22 are connected in each case to a winding head arrangement 24. Connectors of the stator winding 20, for example on a terminal box, are not illustrated for the sake of clarity.

Figure 2:
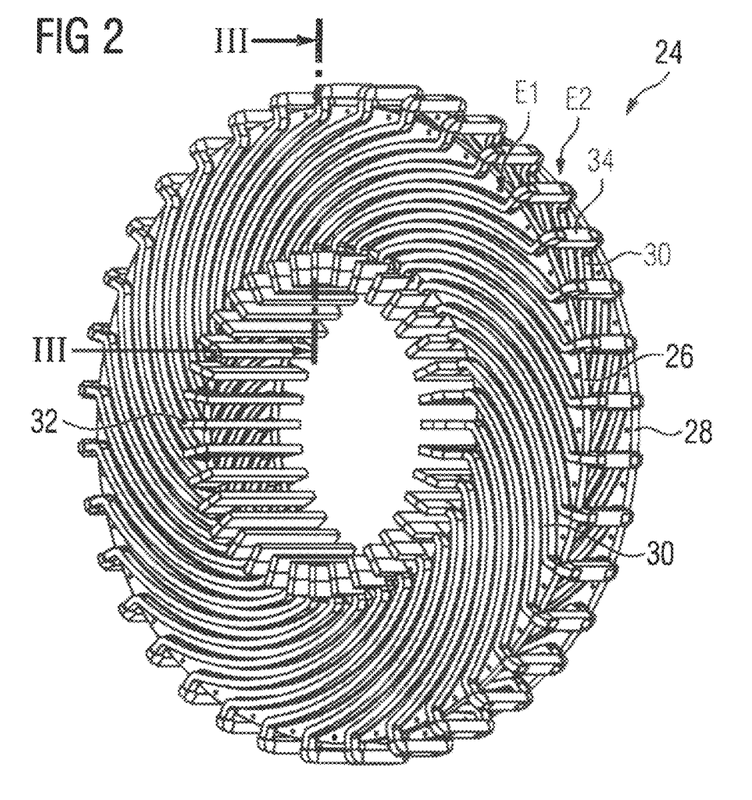
FIG. 2 shows a three-dimensional illustration of a winding head arrangement for an electric rotating machine.

FIG. 2 illustrates a three dimensional illustration of a winding head arrangement 24 for an electric rotating machine 2. The winding head arrangement 24 comprises in an exemplary manner two planes E1, E2 having in each case a base body 26, 28 and said planes are arranged in the axial direction one behind the other. The winding head arrangement 24 is provided for a two layered winding. The base body 26, 28 has an essentially hollow cylindrical shape. Each plane is allocated a plurality of conductors 30, wherein the conductors 30 are connected to the respective base body 26, 28. The conductors 30 have in an exemplary manner a rectangular or square conductor cross section and are produced from a first metal material, for example copper, having a conductivity of at least 50 MS/m. Metal connecting sections 32 are arranged on the conductors 30 in order to produce a connection of the conductors 30 to the respective coil rods 22. Furthermore, the conductors 30 are connected to the respective planes E1, E2 via electrically conductive connecting elements 34. For example, the connecting elements 34 are produced from copper. The further embodiment of the winding head arrangement 24 in FIG. 2 corresponds to the embodiment in FIG. 1.

Figure 3:
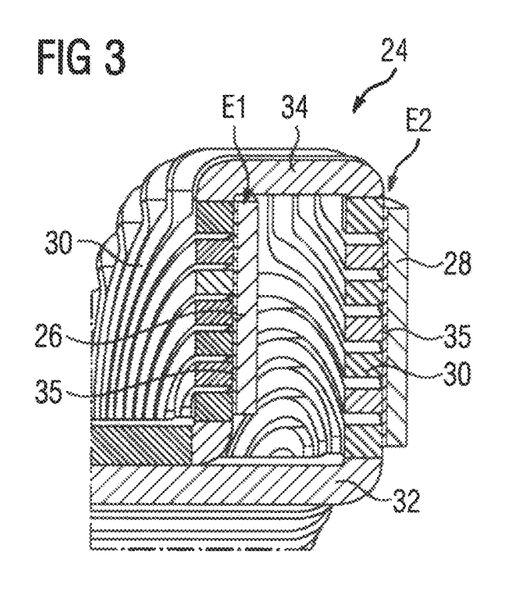
FIG. 3 shows an enlarged cross section of a first embodiment of a winding head arrangement.

FIG. 3 illustrates an enlarged cross section of a first embodiment of a winding head arrangement 24. The base bodies 26, 28 are produced from an electrically conducive material, for example a second metal material such as aluminum, wherein the electrically conductive material comprises an electrically insulating coaling 35.

The conductors 30 are produced from electrically conducive solid particles that are sprayed onto the electrically insulating coating 35 of the respective base body 26, 28 by means of a first thermal spraying method, in particular by means of cold gas spraying. The electrically conducive solid particles contain for example copper, wherein an electrical conductivity of at least 50 MS/m is achieved by means of the first thermal spraying method. The conductors 30 are arranged insulated from the electrically conducive material of the respective base body 26, 28 owing to the insulating coating 35 and are connected to said base body via the insulating coating 35. The further embodiment of the winding head arrangement 24 in FIG. 3 corresponds to the embodiment in FIG. 2.

Figure 4:
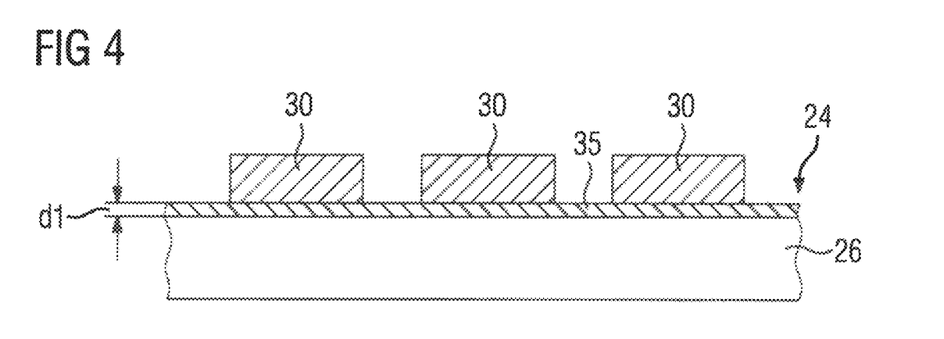
FIG. 4 shows a cross section of conductors of a first embodiment of the winding head arrangement.

FIG. 4 illustrates a cross section of conductors 30 of a first embodiment of the winding head arrangement 24 and said conductors are connected to a base body 26. The base body 26 is produced from an electrically conducive material and comprises an electrically insulating coating 35 on the surface that is facing the conductors 30 and the conductors 30 are connected to the base body 26 via said electrically insulating coating. A short circuit of the conductors 30 is prevented via the electrically conductive material of the base body 26 by the electrically insulating coating 35. The electrically insulating coating 35 has an essentially constant first thickness d1 in the range of 150 μm to 1000 μm, in particular 200 μm to 500 μm. For example, the base body 26 is produced from a second metal material, in particular from aluminum. The electrically insulating coating 35 is produced by the anodization, in other words by a controlled oxidative conversion, of the second metal material. The anodization is performed for example by means of an electrolysis in an aqueous solution. A homogenous aluminum oxide layer that is resistant to a disruptive discharge is embodied by the anodization of the aluminum surface and the conductors 30 are connected to the base body 26 in an electrically insulated manner via said aluminum oxide layer. The further embodiment of the winding head arrangement 24 in FIG. 4 corresponds to the embodiment in FIG. 3.

Figure 5:
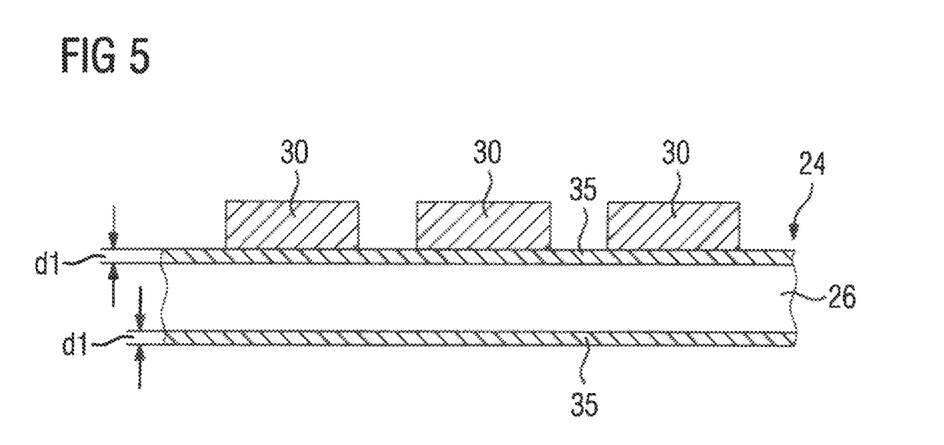
FIG. 5 shows a cross section of conductors of a second embodiment of the winding head arrangement.

FIG. 5 illustrates a cross section of conductors 30 of a second embodiment of the winding head arrangement 24. The surface of the base body 26 in FIG. 5 is essentially entirely anodized with the result that a homogenous insulating coating 35 that is resistant to a disruptive discharge is embodied on the entire surface of the base body 26. The further embodiment of the winding head arrangement 24 in FIG. 5 corresponds to the embodiment in FIG. 4.

Figure 6:
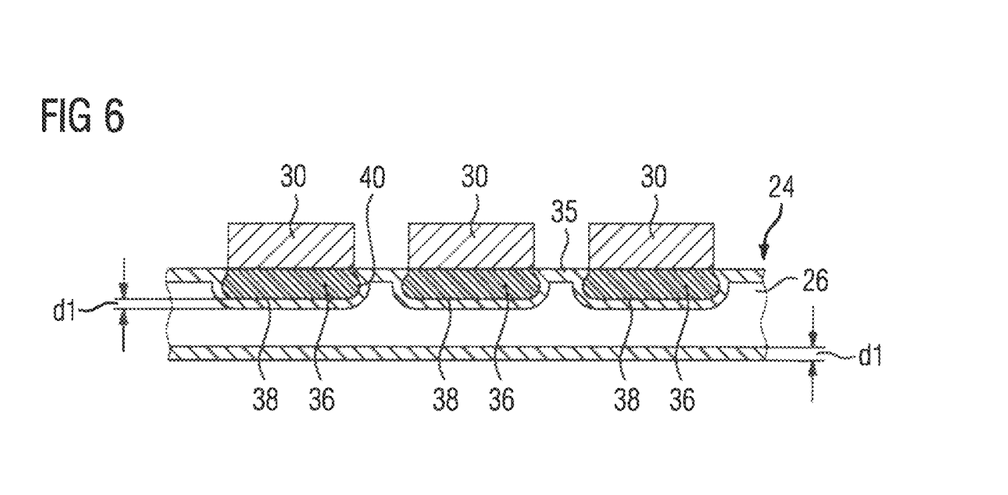
FIG. 6 shows a cross section of conductors of a third embodiment of the winding head arrangement and FIG. 7 shows a cross section of conductors of a fourth embodiment of the winding head arrangement.

FIG. 6 illustrates a cross section of conductors 30 of a third embodiment of the winding head arrangement 24, wherein the conductors 30 are each connected to the base body 26 via an intermediate layer 36, wherein the intermediate layer 36 forms a conductor base and is connected to the respective insulating base body 26, 28 via a positive-locking connection. The intermediate layer 36 is in each case arranged in grooves 38 of the base body 26, wherein the intermediate layer 36 terminates essentially flush with the surface of the base body 26 that is facing the conductors 30. The surface of the base body 26 is also anodized within the grooves 38 with the result that a homogenous insulating coating 35 that is resistant to a disruptive discharge is embodied on the entire surface of the base body 26. The coated grooves 38 have a profiling 40 and a positive-locking connection to the insulating base body 26 is produced via said profiling. In particular, the groove 38 is profiled as tapered outwards in order to ensure a positive-locking connection of the respective intermediate layer 36 to the insulating base body 26. For example, the groove 38 is embodied as a hammer head groove or as a dovetail groove. The intermediate layer 36 is produced from a material that differs from the first metal material of the conductors 30 and from the second metal material of the base body. The intermediate layer 36 is for example produced from silver, aluminum, antimony, magnesium, tin, zinc, lead, tantalum or from a mixture and/or from at least one alloy of said materials. The intermediate layer 36 has optionally additional filling materials such as for example a ceramic material.

The intermediate layer 36 is sprayed onto the insulating coating 35 of the base body 26 by means of a second thermal spraying method, in particular by means of cold gas spraying. In order to fill the groove 38 in a homogenous manner despite the profiling 40, the particles of the second thermal spraying method are sprayed from different directions into the respective groove 38. Alternatively, the intermediate layer 36 is introduced into the grooves 38 in another manner, for example by casting or by a galvanic method.

The conductors 30 are sprayed onto the intermediate layer 36 by means of a first thermal spraying method, in particular by means of cold gas spraying. In particular in the case of the use of particles of copper that are sprayed onto the intermediate layer 36 by means of cold gas spraying, the intermediate layer 36 renders it possible to provide an improved adhesion and a greater particle density since the particles can be sprayed onto the intermediate layer 36 at a higher speed than onto the insulating coating 35 of the base body 26. The further embodiment of the winding head arrangement 24 in FIG. 6 corresponds to the embodiment in FIG. 5.

Figure 7:
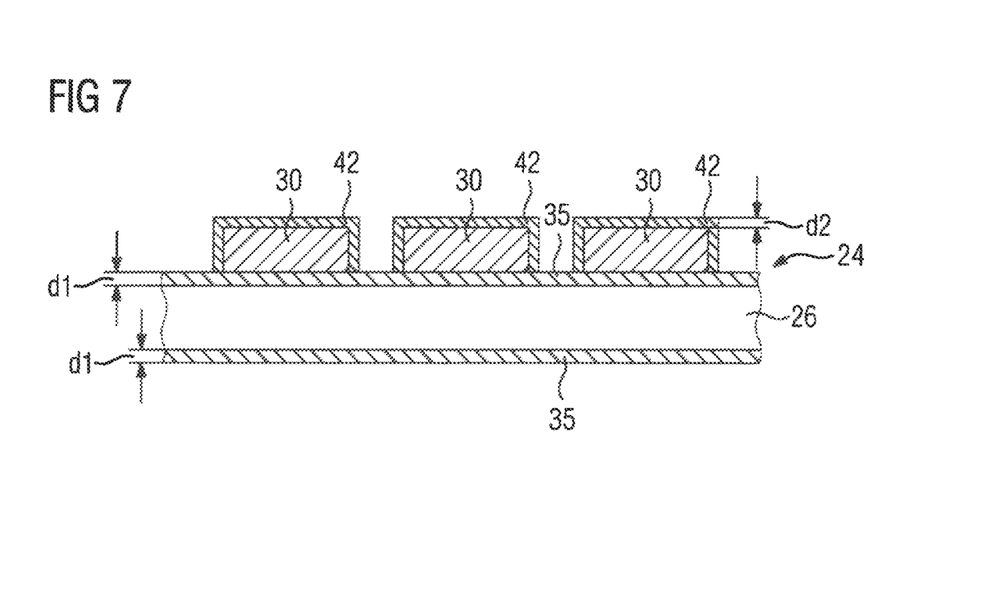

FIG. 7 illustrates a cross section of conductors 30 of a fourth embodiment of the winding head arrangement 24. The conductors 30 that are produced from copper have an electrically insulating conductor coating 42 that has a second thickness d2 in the range of 150 μm to 1000 μm, in particular of 200 μm to 500 μm, and is produced by anodization.

In the case of the production of the electrically insulating conductor coating 42, a third metal material is sprayed onto the copper conductors 30, in particular by means of cold gas spraying, wherein the third metal material contains for example aluminum. A homogenous insulating conductor coating 42 that is resistant to a disruptive discharge is embodied by the at least in part anodization of the third metal material, for example by controlled oxidative conversion of aluminum into aluminum oxide. The further embodiment of the winding head arrangement 24 in FIG. 7 corresponds to the embodiment in FIG. 5.

In summary, the invention relates to a winding head arrangement 4 for an electric rotating machine. In order to disclose a winding head arrangement 24 that is simpler and more cost-effective to produce in comparison to the prior art, it is proposed that the winding head arrangement 24 has at least one base body 26, 28 and a plurality of conductors 30 that are embodied from a first metal material, wherein the base body 26, 28 comprises an electrically conductive material having an electrically insulating coating 35, wherein the conductors 30 are connected to the base body 26, 28 via the electrically insulating coating 35 and wherein the conductors 30 are applied to the electrically insulating coating 35 by means of a first additive production method.

The invention claimed is:

1. A winding head arrangement for an electric rotating machine, comprising:
   a base body including an electrically conductive material having an electrically insulating coating; and
   a plurality of conductors made from a first metal material and connected to the base body via the electrically insulating coating by a first additive production method,
   wherein the electrically insulating coating is produced by anodization of a second metal material.

2. The winding head arrangement of claim 1, wherein the base body is produced from a second metal material, said electrically insulating coating of the base body being produced by anodization of the second metal material.

3. The winding head arrangement of claim 1, wherein the conductors are sprayed onto the electrically insulating coating by a thermal spraying method.

4. The winding head arrangement of claim 3, wherein the thermal spraying method includes cold gas spraying.

5. The winding head arrangement of claim 1, wherein the electrically insulating coating has an essentially constant thickness in a range of 150 μm to 1000 μm.

6. The winding head arrangement of claim 1, wherein the conductors are each connected to the electrically insulating coating via an intermediate layer.

7. The winding head arrangement of claim 6, wherein the intermediate layer is applied to the electrically insulating coating by a second additive production method which differs from the first additive production method.

8. The winding head arrangement of claim 7, wherein the first additive production method is a first thermal spraying method, and the second additive production method is a second thermal spraying method, with the second thermal spraying method differing from the first thermal spraying method with regard to speed and/or size of particles.

9. The winding head arrangement of claim 6, wherein the intermediate layer is arranged at least in part in a groove of the base body, said groove of the base body having a profiling to establish a positive-locking connection of the intermediate layer and the base body.

10. The winding head arrangement of claim 1, wherein the plurality of conductors are mechanically connected to the base body in a thermally stable manner.

11. A stator for an electric rotating machine, said stator comprising:
a magnetic field guiding stator element; and
a winding head arrangement as set forth in claim 1.

12. The stator of claim 11, further comprising coil rods arranged at least in part extending in the magnetic field guiding stator element and connected to the conductors of the winding head arrangement, said conductors being arranged essentially perpendicular to the coil rods.

13. An electric rotating machine, comprising the stator as set forth in claim 11.

14. A winding head arrangement for an electric rotating machine, comprising:
a base body including an electrically conductive material having an electrically insulating coating; and
a plurality of conductors made from a first metal material and connected to the base body via the electrically insulating coating by a first additive production method, wherein the conductors have an electrically insulating conductor coating that is produced by anodization.

15. The winding head arrangement of claim 14, wherein the conductors have applied thereon a third metal material in an additive manner, said electrically insulating conductor coating being produced by at least in part anodization of the third metal material.

16. The winding head arrangement of claim 15, wherein the third metal material is applied on the conductors by cold gas spraying.

17. The winding head arrangement of claim 14, wherein the conductors are sprayed onto the electrically insulating coating by a thermal spraying method.

18. The winding head arrangement of claim 17, wherein the thermal spraying method includes cold gas spraying.

19. A method for producing a winding head arrangement for an electric rotating machine, said method comprising:
coating an electrically conductive material at least in part with an electrically insulating coating to produce a base body;
connecting a plurality of conductors made from a first metal material to the base body by applying the conductors to the electrically insulating coating by a first additive production method;
applying a third metal material to the conductors in an additive manner, and
producing the electrically insulating conductor coating by at least in part anodization of the third metal material.

20. The method of claim 19, further comprising producing the electrically insulating coating by anodization of a second metal material.

21. The method of claim 19, wherein the base body is produced from a second metal material, with the electrically insulating coating being produced by anodization of the second metal material.

22. The method of claim 19, wherein the conductors are sprayed onto the electrically insulating coating by a first thermal spraying method.

23. The method of claim 22, wherein the first thermal spraying method includes cold gas spraying.

24. The method of claim 19, further comprising insulating the conductors by an electrically insulating conductor coating that is produced by anodization.

25. The method of claim 19, further comprising connecting each of the conductors to the electrically insulating coating via an intermediate layer.

26. The method of claim 25, wherein the intermediate layer is applied to the electrically insulating coating by a second additive production method which differs from the first thermal spraying method.

27. The method of claim 26, wherein the first additive production method is a first thermal spraying method, and the second additive production method is a second thermal spraying method, with the second thermal spraying method differing from the first thermal spraying method with regard to speed and/or size of particles.

28. The method of claim 25, further comprising:
arranging the intermediate layer at least in part in a groove of the base body; and
providing the groove with a profiling to establish a positive-locking connection of the intermediate layer and the base body.

29. The method of claim 19, wherein the conductors are sprayed onto the electrically insulating coating by a first thermal spraying method.

30. The method of claim 29, wherein the first thermal spraying method includes cold gas spraying.

31. The method of claim 19, wherein the third metal material is applied to the conductors by cold gas spraying.

* * * * *